United States Patent
Rosa et al.

(10) Patent No.: US 12,193,069 B2
(45) Date of Patent: Jan. 7, 2025

(54) METHODS AND APPARATUSES FOR SIGNALING PROCEDURE

(71) Applicant: Nokia Technologies Oy, Espoo (FI)

(72) Inventors: Claudio Rosa, Randers (DK); Nuno K. Pratas, Gistrup (DK); Chunli Wu, Beijing (CN); Samuli Turtinen, Ii (FI)

(73) Assignee: Nokia Technologies Oy, Espoo (FI)

( * ) Notice: Subject to any disclaimer, the term of this patent is extended or adjusted under 35 U.S.C. 154(b) by 296 days.

(21) Appl. No.: 17/771,039

(22) PCT Filed: Nov. 1, 2019

(86) PCT No.: PCT/CN2019/114952
§ 371 (c)(1),
(2) Date: Apr. 22, 2022

(87) PCT Pub. No.: WO2021/081971
PCT Pub. Date: May 6, 2021

(65) Prior Publication Data
US 2022/0417998 A1    Dec. 29, 2022

(51) Int. Cl.
*H04W 74/0833*    (2024.01)
(52) U.S. Cl.
CPC .............................. *H04W 74/0833* (2013.01)
(58) Field of Classification Search
CPC ........... H04W 74/0833; H04W 72/541; H04W 72/0453
See application file for complete search history.

(56) References Cited

U.S. PATENT DOCUMENTS

| | | |
|---|---|---|
| 2007/0178940 A1 | 8/2007 | Hara |
| 2013/0089068 A1 | 4/2013 | Kalhan |
| 2019/0132882 A1 | 5/2019 | Li et al. |

FOREIGN PATENT DOCUMENTS

| | | |
|---|---|---|
| CN | 103281788 A | 9/2013 |
| WO | 2017/076598 A1 | 5/2017 |
| WO | 2019/128765 A1 | 7/2019 |

OTHER PUBLICATIONS

Office Action received for corresponding Indian Patent Application No. 202247028049, dated Sep. 5, 2022, 5 pages.
"New work item: 2-step RACH for NR", 3GPP TSG RAN Meeting #82, RP-182894, Agenda: 9.1.1, ZTE Corporation, Dec. 10-13, 2018, 5 pages.
"On Initial Access and Mobility for NR-U", 3GPP TSG RAN WG1 Meeting #95, R1-1812698, Agenda: 7.2.2.4.2, Nokia, Nov. 12-16, 2018, 12 pages.
International Search Report and Written Opinion received for corresponding Patent Cooperation Treaty Application No. PCT/CN2019/114952, dated Jul. 29, 2020, 10 pages.
"On wideband operation in NR-U", 3GPP TSG RAN WG1 Meeting #96bis, R1-1904194, Agenda: 7.2.2.2.5, Nokia, Apr. 8-12, 2019, 15 pages.

(Continued)

*Primary Examiner* — Eric Myers
(74) *Attorney, Agent, or Firm* — Barta Jones, PLLC

(57) ABSTRACT

Disclosed are apparatuses and methods for a signaling procedure. An example method may include transmitting a first portion of a signaling message in a first sub-band and transmitting a second portion of the signaling message in a second sub-band, the second portion including an indication to the first portion transmitted in the first sub-band. Related apparatuses and computer readable medium are also disclosed.

6 Claims, 10 Drawing Sheets

(56) References Cited

OTHER PUBLICATIONS

Extended European Search Report received for corresponding European Patent Application No. 19950278.2, dated Jun. 19, 2023, 10 pages.
"Enhancement on two-step Random Access for NR-U", 3GPP TSG-RAN WG2 Meeting 107bis, R2-1913035, Agenda: 6.2.2.3, Huawei, Oct. 14-18, 2019, 3 pages.
"Channel Structure for Two-Step RACH", 3GPP TSG-RAN WG1 Meeting #98bis, R1-1910906, Agenda: 7.2.1.1, Ericsson, Oct. 14-18, 2019, 16 pages.
Office Action received for corresponding Indonesian Patent Application No. P00202205300, dated Apr. 1, 2024, 3 pages of Office Action and 3 pages of translation available.
Office Action received for corresponding Vietnamese Patent Application No. 1-2022-02686, dated Aug. 29, 2024, 2 pages of Office Action and 2 pages of translation available.

| Cross-band | | No Cross-band | |
|---|---|---|---|
| Preamble # | DMRS port # | Preamble # | DMRS port # |
| 1 | 1 | 1 | 5 |
| 2 | 1 | 2 | 5 |
| 3 | 1 | 3 | 5 |
| 4 | 1 | 4 | 5 |
| 5 | 2 | 5 | 6 |
| 6 | 2 | 6 | 6 |
| 7 | 2 | 7 | 6 |
| 8 | 2 | 8 | 6 |
| 9 | 3 | 9 | 7 |
| 10 | 3 | 10 | 7 |
| 11 | 3 | 11 | 7 |
| 12 | 3 | 12 | 7 |
| 13 | 4 | 13 | 8 |
| 14 | 4 | 14 | 8 |
| 15 | 4 | 15 | 8 |
| 16 | 4 | 16 | 8 |

| Sub-band #1 | | Sub-band #2 | | Sub-band #3 | |
|---|---|---|---|---|---|
| Preamble # | DMRS port # | Preamble # | DMRS port # | Preamble # | DMRS port # |
| 1 | 1 | 1 | 5 | 1 | 4 |
| 2 | 1 | 2 | 5 | 2 | 4 |
| 3 | 1 | 3 | 5 | 3 | 4 |
| 4 | 1 | 4 | 5 | 4 | 4 |
| 5 | 2 | 5 | 6 | 5 | 8 |
| 6 | 2 | 6 | 6 | 6 | 8 |
| 7 | 2 | 7 | 6 | 7 | 8 |
| 8 | 2 | 8 | 6 | 8 | 8 |
| 9 | 3 | 9 | 7 | 9 | 9 |
| 10 | 3 | 10 | 7 | 10 | 9 |
| 11 | 3 | 11 | 7 | 11 | 9 |
| 12 | 3 | 12 | 7 | 12 | 9 |

METHODS AND APPARATUSES FOR SIGNALING PROCEDURE

RELATED APPLICATION

This application was originally filed as PCT Application No. PCT/CN2019/114952, filed on Nov. 1, 2019, of which is incorporated herein by reference in its entirety.

TECHNICAL FIELD

Various example embodiments relate to methods and apparatuses for a signaling procedure.

BACKGROUND

An interference check, such as a Listen-Before-Talk (LBT or sometimes called Listen-Before-Transmit), may be used in radio communications whereby a radio transmitter may sense its radio environment before it starts a transmission, for example, in an unlicensed spectrum, and frequency diversity techniques may be applied to cope with performance degradation associated with interference check failures.

SUMMARY

In a first aspect, a method is disclosed. The method may include transmitting a first portion of a signaling message in a first sub-band, and transmitting a second portion of the signaling message in a second sub-band, the second portion including an indication to the first portion transmitted in the first sub-band.

In some example embodiments, the second sub-band is different from the first sub-band in a case where an interference check on the second sub-band is passed.

In some example embodiments, the method may further include monitoring for a response to the signaling message from an access network on multiple sub-bands including at least the first and second sub-bands.

In some example embodiments, the first portion includes a preamble for a random access procedure and the second portion further includes a data part of the random access procedure.

In some example embodiments, the indication includes a mapping between the preamble in the first portion in the first sub-band and a demodulation reference signal port for transmitting the second portion.

In some example embodiments, the second portion is instead transmitted in the first sub-band, in a case where an interference check on other sub-band or sub-bands than the first sub-band fails.

In a second aspect, a method is disclosed. The method may include receiving a first portion of a signaling message in a first sub-band, receiving a second portion of the signaling message in a second sub-band, the second portion including an indication to the first portion received in the first sub-band, and determining, according to the indication, that the first portion in the first sub-band and the second portion in the second sub-band are from a same user equipment.

In some example embodiments, the method may further include preparing a response to the signaling message for the user equipment on multiple sub-bands including the first sub-band and the second sub-band in a case where the second sub-band is different from the first sub-band.

In some example embodiments, the method may further include transmitting the response in at least one sub-band of the multiple sub-bands in a case where an interference check on the at least one sub-band is passed.

In some example embodiments, the first portion includes a preamble for a random access procedure and the second portion further includes a data part of the random access procedure.

In some example embodiments, the indication includes a mapping between the preamble in the first portion in the first sub-band and a demodulation reference signal port used for transmitting the second portion.

In some example embodiments, the first portion and the second portion are determined to be from the same user equipment based on the mapping.

In some example embodiments, the method may further include preparing a response to the signaling message for the user equipment on the first sub-band in a case where the second sub-band is the same as the first sub-band or in a case of a failure in a detection of the indication in the second portion in the second sub-band.

In a third aspect, an apparatus is disclosed. The apparatus may include at least one processor, and at least one memory including computer program code, wherein the at least one memory and the computer program code may be configured to, with the at least one processor, cause the apparatus to perform transmitting a first portion of a signaling message in a first sub-band, and transmitting a second portion of the signaling message in a second sub-band, the second portion including an indication to the first portion transmitted in the first sub-band.

In some example embodiments, the second sub-band is different from the first sub-band in a case where an interference check on the second sub-band is passed.

In some example embodiments, the at least one memory and the computer program code may be further configured to, with the at least one processor, cause the apparatus to perform monitoring for a response to the signaling message from an access network on multiple sub-bands including at least the first and second sub-bands.

In some example embodiments, the first portion includes a preamble for a random access procedure and the second portion further includes a data part of the random access procedure.

In some example embodiments, the indication includes a mapping between the preamble in the first portion in the first sub-band and a demodulation reference signal port for transmitting the second portion.

In some example embodiments, the second portion is instead transmitted in the first sub-band, in a case where an interference check on other sub-band or sub-bands than the first sub-band fails.

In a fourth aspect, an apparatus is disclosed. The apparatus may include at least one processor, and at least one memory including computer program code, wherein the at least one memory and the computer program code may be configured to, with the at least one processor, cause the apparatus to perform receiving a first portion of a signaling message in a first sub-band, receiving a second portion of the signaling message in a second sub-band, the second portion including an indication to the first portion received in the first sub-band, and determining, according to the indication, that the first portion in the first sub-band and the second portion in the second sub-band are from a same user equipment.

In some example embodiments, the at least one memory and the computer program code may be further configured to, with the at least one processor, cause the apparatus to perform, in a case where the second sub-band is different from the first sub-band, preparing a response to the signaling message for the user equipment on multiple sub-bands including the first sub-band and the second sub-band.

In some example embodiments, the at least one memory and the computer program code may be further configured to, with the at least one processor, cause the apparatus to perform transmitting the response in at least one sub-band of the multiple sub-bands in a case where an interference check on the at least one sub-band is passed.

In some example embodiments, the first portion includes a preamble for a random access procedure and the second portion further includes a data part of the random access procedure.

In some example embodiments, the indication includes a mapping between the preamble in the first portion in the first sub-band and a demodulation reference signal port used for transmitting the second portion.

In some example embodiments, the first portion and the second portion are determined to be from the same user equipment based on the mapping.

In some example embodiments, the at least one memory and the computer program code may be further configured to, with the at least one processor, cause the apparatus to perform, in a case where the second sub-band is the same as the first sub-band or in a case of a failure in a detection of the indication in the second portion in the second sub-band, preparing a response to the signaling message for the user equipment on the first sub-band.

In a fifth aspect, disclosed is a computer readable medium comprising instructions stored thereon for causing an apparatus to perform transmitting a first portion of a signaling message in a first sub-band, and transmitting a second portion of the signaling message in a second sub-band, the second portion including an indication to the first portion transmitted in the first sub-band.

In some example embodiments, the second sub-band is different from the first sub-band in a case where an interference check on the second sub-band is passed.

In some example embodiments, the instructions may further cause the apparatus to perform monitoring for a response to the signaling message from an access network on multiple sub-bands including at least the first and second sub-bands.

In some example embodiments, the first portion includes a preamble for a random access procedure and the second portion further includes a data part of the random access procedure.

In some example embodiments, the indication includes a mapping between the preamble in the first portion in the first sub-band and a demodulation reference signal port for transmitting the second portion.

In some example embodiments, the second portion is instead transmitted in the first sub-band, in a case where an interference check on other sub-band or sub-bands than the first sub-band fails.

In a sixth aspect, disclosed is a computer readable medium comprising instructions stored thereon for causing an apparatus to perform receiving a first portion of a signaling message in a first sub-band, receiving a second portion of the signaling message in a second sub-band, the second portion including an indication to the first portion received in the first sub-band, and determining, according to the indication, that the first portion in the first sub-band and the second portion in the second sub-band are from a same user equipment.

In some example embodiments, the instructions may further cause the apparatus to perform, in a case where the second sub-band is different from the first sub-band, preparing a response to the signaling message for the user equipment on multiple sub-bands including the first sub-band and the second sub-band.

In some example embodiments, the instructions may further cause the apparatus to perform transmitting the response in at least one sub-band of the multiple sub-bands in a case where an interference check on the at least one sub-band is passed.

In some example embodiments, the first portion includes a preamble for a random access procedure and the second portion further includes a data part of the random access procedure.

In some example embodiments, the indication includes a mapping between the preamble in the first portion in the first sub-band and a demodulation reference signal port used for transmitting the second portion.

In some example embodiments, the first portion and the second portion are determined to be from the same user equipment based on the mapping.

In some example embodiments, the instructions may further cause the apparatus to perform, in a case where the second sub-band is the same as the first sub-band or in a case of a failure in a detection of the indication in the second portion in the second sub-band, preparing a response to the signaling message for the user equipment on the first sub-band.

In a seventh aspect, an apparatus is disclosed. The apparatus may include means for transmitting a first portion of a signaling message in a first sub-band, and means for transmitting a second portion of the signaling message in a second sub-band, the second portion including an indication to the first portion transmitted in the first sub-band In some example embodiments, the second sub-band is different from the first sub-band in a case where an interference check on the second sub-band is passed.

In some example embodiments, the apparatus may further include means for monitoring for a response to the signaling message from an access network on multiple sub-bands including at least the first and second sub-bands.

In some example embodiments, the first portion includes a preamble for a random access procedure and the second portion further includes a data part of the random access procedure.

In some example embodiments, the indication includes a mapping between the preamble in the first portion in the first sub-band and a demodulation reference signal port for transmitting the second portion.

In some example embodiments, the second portion is instead transmitted in the first sub-band, in a case where an interference check on other sub-band or sub-bands than the first sub-band fails.

In an eighth aspect, an apparatus is disclosed. The apparatus may include means for receiving a first portion of a signaling message in a first sub-band, means for receiving a second portion of the signaling message in a second sub-band, the second portion including an indication to the first portion received in the first sub-band, and means for determining, according to the indication, that the first portion in the first sub-band and the second portion in the second sub-band are from a same user equipment.

In some example embodiments, the apparatus may further include means for preparing a response to the signaling message for the user equipment on multiple sub-bands including the first sub-band and the second sub-band, in a case where the second sub-band of the second portion is different from the first sub-band of the first portion.

In some example embodiments, the apparatus may further include means for transmitting the response in at least one sub-band of the multiple sub-bands in a case where an interference check on the at least one sub-band is passed.

In some example embodiments, the first portion includes a preamble for a random access procedure and the second portion further includes a data part of the random access procedure.

In some example embodiments, the indication includes a mapping between the preamble in the first portion in the first sub-band and a demodulation reference signal port used for transmitting the second portion.

In some example embodiments, the first portion and the second portion are determined to be from the same user equipment based on the mapping.

In some example embodiments, the apparatus may further include means for preparing a response to the signaling message for the user equipment on the first sub-band in a case where the second sub-band is the same as the first sub-band or in a case of a failure in a detection of the indication in the second portion in the second sub-band.

In a ninth aspect, an apparatus is disclosed. The apparatus may include a circuitry configured to transmit a first portion of a signaling message in a first sub-band, and a circuitry configured to transmit a second portion of the signaling message in a second sub-band, the second portion including an indication to the first portion transmitted in the first sub-band In some example embodiments, the second sub-band is different from the first sub-band in a case where an interference check on the second sub-band is passed.

In some example embodiments, the apparatus may further include a circuitry configured to monitor for a response to the signaling message from an access network on multiple sub-bands including at least the first and second sub-bands.

In some example embodiments, the first portion includes a preamble for a random access procedure and the second portion further includes a data part of the random access procedure.

In some example embodiments, the indication includes a mapping between the preamble in the first portion in the first sub-band and a demodulation reference signal port for transmitting the second portion.

In some example embodiments, the second portion is instead transmitted in the first sub-band, in a case where an interference check on other sub-band or sub-bands than the first sub-band fails.

In a tenth aspect, an apparatus is disclosed. The apparatus may include a circuitry configured to receive a first portion of a signaling message in a first sub-band, a circuitry configured to receive a second portion of the signaling message in a second sub-band, the second portion including an indication to the first portion received in the first sub-band, and a circuitry configured to determine, according to the indication, that the first portion in the first sub-band and the second portion in the second sub-band are from a same user equipment.

In some example embodiments, the apparatus may further include a circuitry configured to prepare a response to the signaling message for the user equipment on multiple sub-bands including the first sub-band and the second sub-band, in a case where the second sub-band of the second portion is different from the first sub-band of the first portion.

In some example embodiments, the apparatus may further include a circuitry configured to transmit the response in at least one sub-band of the multiple sub-bands in a case where an interference check on the at least one sub-band is passed.

In some example embodiments, the first portion includes a preamble for a random access procedure and the second portion further includes a data part of the random access procedure.

In some example embodiments, the indication includes a mapping between the preamble in the first portion in the first sub-band and a demodulation reference signal port used for transmitting the second portion.

In some example embodiments, the first portion and the second portion are determined to be from the same user equipment based on the mapping.

In some example embodiments, the apparatus may further include a circuitry configured to prepare a response to the signaling message for the user equipment on the first sub-band in a case where the second sub-band is the same as the first sub-band or in a case of a failure in a detection of the indication in the second portion in the second sub-band.

BRIEF DESCRIPTION OF THE DRAWINGS

Some example embodiments will now be described, by way of non-limiting examples, with reference to the accompanying drawings.

FIG. 7 illustrates an example mapping according to an example embodiment.

DETAILED DESCRIPTION

Examples of sub-bands herein may include, but not limit to, Component Carries (CCs) and Bandwidth Parts (BWP), or each BWP or CC may have multiple sub-bands for wideband operation.

A signaling procedure, such as a random access (RA) procedure and other procedures by sequential protocols, may suffer performance degradation due to interference check failures. For example, when an interference check fails, or when a mobile station or user equipment (UE), as a radio transmitter, detects an interferer in the channel or sub-band, the transmission of the UE is postponed to a later time when the channel or sub-band becomes available again. Thus, for example, frequency diversity techniques may be applied, for example by allowing the radio transmitter to perform interference checks simultaneously across multiple sub-bands and then to proceed with the transmission on one sub-band for which the interference check passes.

Figure 1:
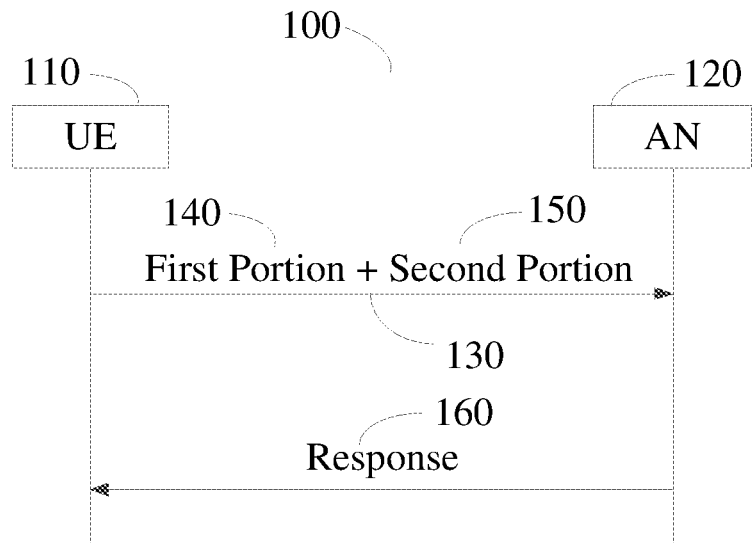
FIG. 1 illustrates an example 2-step random access procedure.

As an example of the above signaling procedure, FIG. 1 illustrates an example 2-step RA procedure 100 between the UE 110 and an access network (AN) 120, for example in a New Radio (5G) communication system.

In the example 2-step RA procedure 100, the UE 110 transmits a first signaling message 130 to the AN 120, for example to a base station in the AN 120. The first signaling message 130 may include a preamble on physical random access channel (PRACH) in a first portion 140 and a data part on physical share channel (PUSCH) in a second portion 150. In response to the first signaling message 130, the AN 120 (e.g. a base station in the AN 120) may transmit to the UE 110 a second signaling message 160 as a response.

Figure 2:
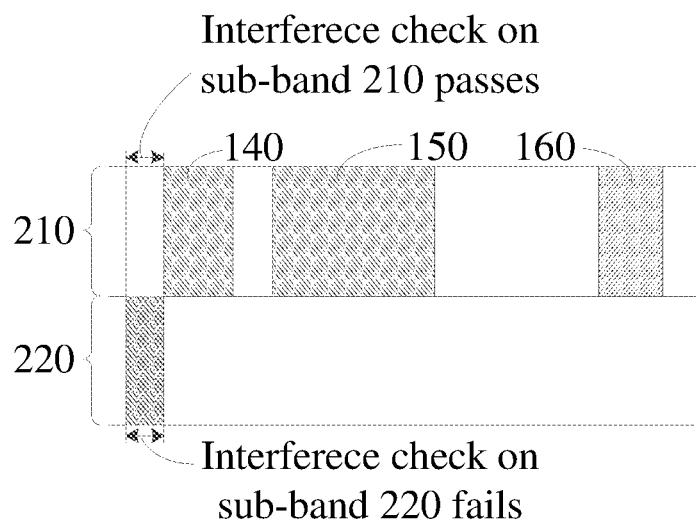
FIG. 2 illustrates an example of utilizing multiple sub-bands according to an example embodiment.

When applying the frequency diversity techniques to the example 2-step RA procedure 100, for example, as illustrated in FIG. 2 where 2 sub-bands 210 and 220 are considered, the UE 110 may perform an interference check on both sub-bands 210 and 220 before transmitting the first portion 140. If the interference check passes on the sub-band 210 but fails on the sub-band 220 temporarily, the UE 110 may select the sub-band 210 to transmit both the first portion 140 and the second portion 150. However, for example, if an interference check fails on the sub-band 210 before transmitting the second portion 150, the transmission of the second portion 150 will be delayed.

Different UEs may have different multi-sub-bands capabilities. For example, some UE receives and transmits on one sub-band at a time while in the more advanced UE capabilities the simultaneous operations on multiple sub-bands may be possible. As such, in the example as illustrated in FIG. 2, subsequent signaling messages between the UE 110 and the AN 120 are also used in the sub-band 210. For example, the AN 120 will transmit the second signaling message 160 also in sub-band 210 and the UE 110 monitors the sub-band 210 for the second signaling message 160, if the interference check failure on the sub-band 220 is temporary, although the UE 110 actually supports simultaneous operations on the two sub-bands 210 and 220. However, for example, if an interference check fails on the sub-band 210 before transmitting the second signaling message 160 (e.g. if the channel continues to be busy for more than the second signaling message 160 window), the transmission of the second signaling message 160 will be delayed or even fail.

Figure 3:
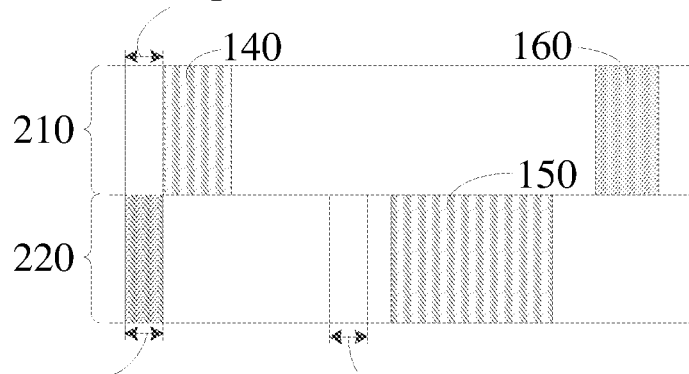
FIG. 3 illustrates another example of utilizing multiple sub-bands according to an example embodiment.

To take more advantages of the frequency diversity techniques, in an example embodiment, on the side of the UE 110, for example as illustrated in FIG. 3, another interference check on the sub-band 220 may be performed for example before transmitting the second portion 150.

If the another interference check passed on the sub-band 220, the UE 110 may select the sub-band 220 to transmit the second portion 150, and then may monitor for the second signaling message 160 on both sub-bands 210 and 220.

On the other hand, the AN 120 may determine that the UE 110 is able to support simultaneous operations on multiple sub-bands, for example, according to different sub-bands of the first portion 140 and the second portion 150, or by some other flag for indicating such an ability of the UE 110 which may be included in the first portion 140 or the second portion 150. Consequently, the AN 120 may prepare the second signaling message 160 on both sub-bands 210 and 220, and then select any one or more sub-bands of the sub-bands 210 and 220 to transmit the second signaling message 160, for example to transmit the second signaling message 160 in the sub-band 210 in the example of FIG. 3.

Figure 4:
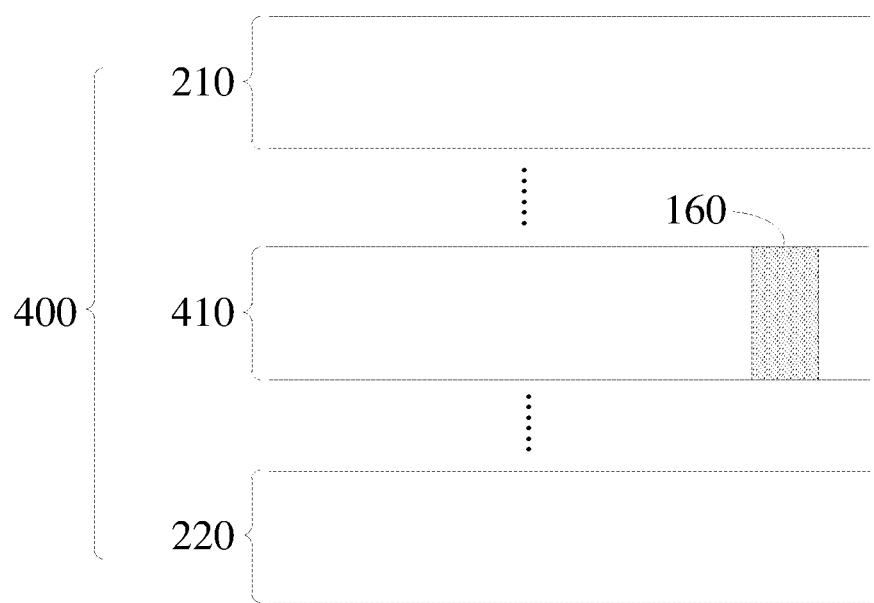
FIG. 4 illustrates an example of multiple sub-bands according to an example embodiment.

It is appreciated that the multiple sub-bands herein are not limited to the two neighboring sub-bands in FIG. 3. For example, as illustrated in FIG. 4, the multiple sub-bands 400 may include one or more other sub-bands such as the sub-band 410, and the sub-bands 210 and 220 may be two boundary sub-bands of the multiple sub-bands. Then, the AN 120 may determine the multiple sub-bands according to the two boundary sub-bands, and may prepare the second signaling message 160 on the multiple sub-bands 400. Then, the AN 120 may select any one or more sub-bands of the multiple sub-bands 400 to transmit the second signaling message 160, for example to transmit the second signaling message 160 in the sub-band 410 in the example of FIG. 4. In another example, the sub-bands 210 and 220 may be any two boundary sub-bands of the multiple sub-bands 400. Correspondingly, the UE 110 may monitor for the second signaling message 160 on the multiple sub-bands including at least the sub-bands 210 and 220.

In the above example embodiment where the first portion 140 and the second portion 150 are transmitted in different sub-bands 210 and 220, an indication to a correspondence between the first portion 140 and the second portion 150, for example an indication to the sub-band 210 of the first portion 140 or to the first portion 140 transmitted in the sub-band 210, may be included in the second portion 150. According to such an indication, the AN 120 may determine which sub-band is used by the UE 110 to transmit the corresponding first portion 140 and then may link the both portions together.

Figure 5:
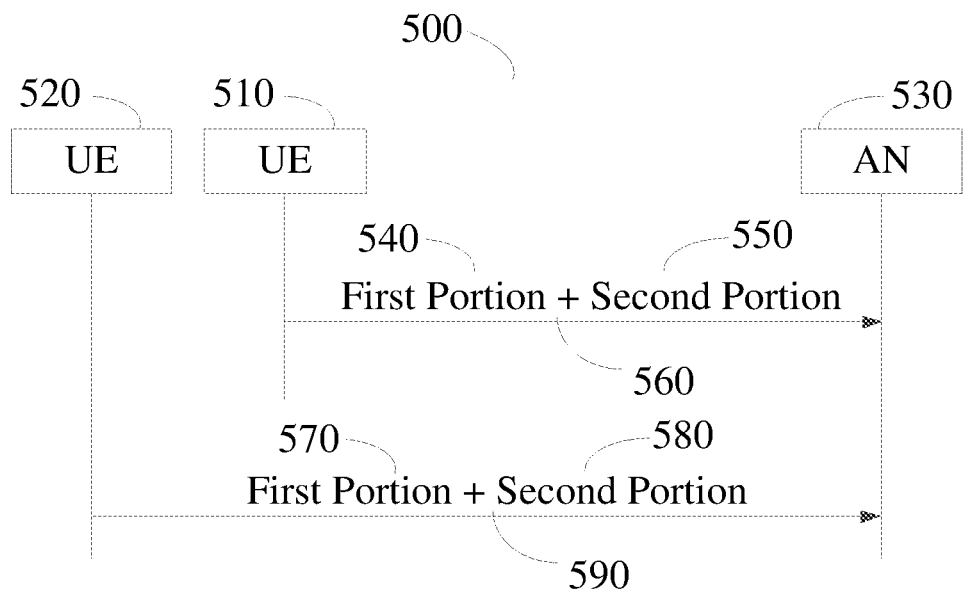
FIG. 5 illustrates an example scenario of utilizing multiple sub-bands according to an example embodiment.
Figure 6:
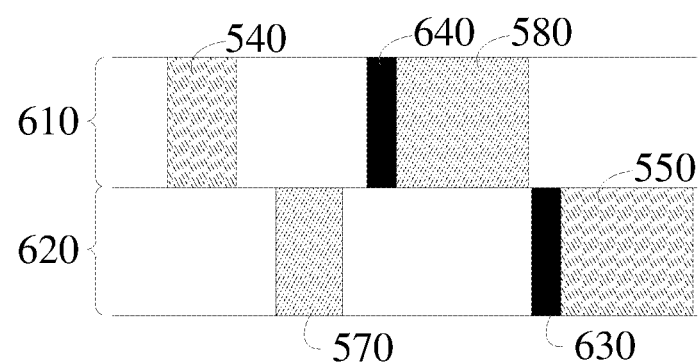
FIG. 6 illustrates an example of utilizing multiple sub-bands according to an example embodiment.

For example, FIG. 5 and FIG. 6 illustrate an example situation 500 where an UE 510 and an UE 520 communicate with the AN 530 in a procedure similar to the above example 2-step RA procedure 100. The UE 510 transmits, to the AN 530, a first portion 540 (for example including a preamble) of a signaling message 560 in a sub-band 610 and a second portion 550 (for example including a data part) of the signaling message 560 in a sub-band 620. The UE 520 transmits, to the AN 530, a first portion 570 (for example including a preamble) of a signaling message 590 in a sub-band 620 and a second portion 580 (for example including a data part) of the signaling message 590 in a sub-band 610.

As illustrated in FIG. 6, the second portion 550 of the UE 510 may include an indication 630 of a correspondence between the first portion 540 in the sub-band 610 and the second portion 550. For example, the indication 630 may indicate the sub-band 610 of the corresponding first portion 140. Similarly, the second portion 580 of the UE 520 may include an indication 640 of a correspondence between the first portion 570 in the sub-band 620 and the second portion 580. For example, the indication 640 may indicate the sub-band 620 of the corresponding first portion 570.

Then, when the AN 530 receives the second portion 580 in the sub-band 610, the AN 530 may detect the indication 640 in the second portion 580, and may determine according to the indication 640 that the first portion corresponding to the second portion 580 is the first portion 570 in the sub-band 620 rather than the first portion 540 in the sub-band 610. Thus, for the UE 520, the AN 530 may link the second portion 580 in the sub-band 610 with the first portion 570 in the sub-band 620 rather than with the first portion 540 in the sub-band 610. Then, the AN 530 may extract for example timing alignment information from the first portion 570 in the sub-band 620, and further decode the second portion 580 in the sub-band 610 based on the extracted timing alignment information.

Similarly, when the AN 530 receives the second portion 550 in the sub-band 620, the AN 530 may detect the indication 630 in the second portion 550, and may determine according to the indication 630 that the first portion corresponding to the second portion 550 is the first portion 540 in the sub-band 610 rather than the first portion 570 in the sub-band 620. Thus, for the UE 510, the AN 530 may link the second portion 550 in the sub-band 620 with the first portion 540 in the sub-band 610 rather than with the first portion 570 in the sub-band 620. Then, the AN 530 may extract for example timing alignment information from the first portion 540 in the sub-band 610, and further decode the second portion 550 in the sub-band 620 based on the extracted timing alignment information.

The indication in the second portion (e.g. the indications 630 and 640) may be any suitable flag or signal for indicating the correspondence between the first and second portions of a signaling message, for example indicating the first sub-band of the corresponding first portion. Moreover, such an indication may be in any suitable form and may include any suitable contents.

For example, a predetermined number of preambles may be applicable in a cell, and a preamble used by a UE may be either specified by the AN, or selected randomly from a predetermined group. Further, a UE may transmit its own reference signals to the AN, and the AN may know the reference signal port of the UE. Further, the reference signal used by the UE may be also specific to the preamble used by the UE. Thus, a correspondence between the preamble in the first portion and a demodulation reference signal (DMRS) in the second portion may be used as the indication in the second portion. For example, the indication in the second portion may indicate a port for transmitting the second portion, such as a demodulation reference signal (DMRS) port.

A part of an example mapping 700 between possible example preambles in the first portion and possible example DMRS ports is illustrated in FIG. 7, where DMRS ports are separated in two groups "Cross-band" and "No Cross-band". "Cross-band" means that the preamble in the first portion is in a different sub-band from the sub-band of the second portion, and "No Cross-band" means that the preamble in the first portion is in a same sub-band as the sub-band of the second portion. The example mapping 700 may used for example in a case of two sub-bands.

For example, referring to the example of FIG. 5 and FIG. 6, assuming that, for the UE 510, first portion 540 in the sub-band 610 includes a preamble #3 in the example mapping 700, and for the UE 520, first portion 570 in the sub-band 620 includes a preamble #4 in the example mapping 700, then the UE 510 may transmit the portion 550 in the sub-band 620 for example via a DMRS port #1 according to the example mapping 700, and the UE 520 may transmit the portion 580 in the sub-band 610 for example via a DMRS port #1 according to the example mapping 700.

Then, when receiving the second portion 580 in the sub-band 610, the AN 530 may determine, for example according to the DMRS in the second portion 580, that the second portion 580 in the sub-band 610 is transmitted by a UE via the DMRS port #1. DMRS port #1 is a "Cross-band" port, based on which the AN 530 may determine that the corresponding first portion is in a sub-band different from the sub-band 610, and in a case of two sub-bands 610 and 620, the AN 530 may determine that the first portion corresponding to the second portion 580 in the sub-band 610 is in the sub-band 620. Since the reference signal used by the UE may be specific to the preamble used by the UE, the first portion 570 in the sub-band 620 including the preamble #4 may be then determined by the AN 530. Then, the AN 530 may link the first portion 570 in the sub-band 620 with the second portion 580 in the sub-band 610, and may further extract information of the preamble #4 from the first portion 570 in the sub-band 620 for decoding the data part in the second portion 580 in the sub-band 610.

Similarly, when receiving the second portion 550 in the sub-band 620, the AN 530 may determine, for example according to the DMRS in the second portion 550, that the second portion 550 in the sub-band 620 is transmitted by a UE via the DMRS port #1. DMRS port #1 is a "Cross-band" port, based on which the AN 530 may determine that the corresponding first portion is in a sub-band different from the sub-band 620, and in a case of two sub-bands 610 and 620, the AN 530 may determine that the first portion corresponding to the second portion 580 in the sub-band 620 is in the sub-band 610. As described above, the reference signal used by the UE may be specific to the preamble used by the UE, and the first portion 540 in the sub-band 610 including the preamble #3 may be then determined by the AN 530. The AN 530 may link the first portion 540 in the sub-band 610 with the second portion 550 in the sub-band 620, and may further extract information of the preamble #3 from the first portion 540 in the sub-band 610 for decoding the data part in the second portion 550 in the sub-band 620.

As another example, if a UE transmits both a first portion of a signaling message, which include for example a preamble #10, and a second portion of the signaling message in the same sub-band, for example the above sub-band 610, for example due to not supporting operations on multiple sub-bands or due to interference check failures on the other sub-bands or the like, the UE may transmit its second portion via for example a DMRS port #7 according to the above example mapping 700.

Then, on the side of AN 530, when receiving the second portion in the sub-band 610, the AN 530 may determine, for example according to the DMRS in the second portion, that the second portion in the sub-band 610 is transmitted by a UE via the DMRS port #7. DMRS port #7 is a "No Cross-band" port, based on which the AN 530 may determine that the corresponding first portion is also in the sub-band 610. As described above, the reference signal used by the UE may be specific to the preamble used by the UE, and the corresponding first portion including the preamble #10 in the sub-band 610 may be determined by the AN 530. Then, the AN 530 may extract information of the preamble #10 from the linked first portion in the sub-band 610 for decoding the data part in the second portion in the sub-band 610.

Figures 8, 9:
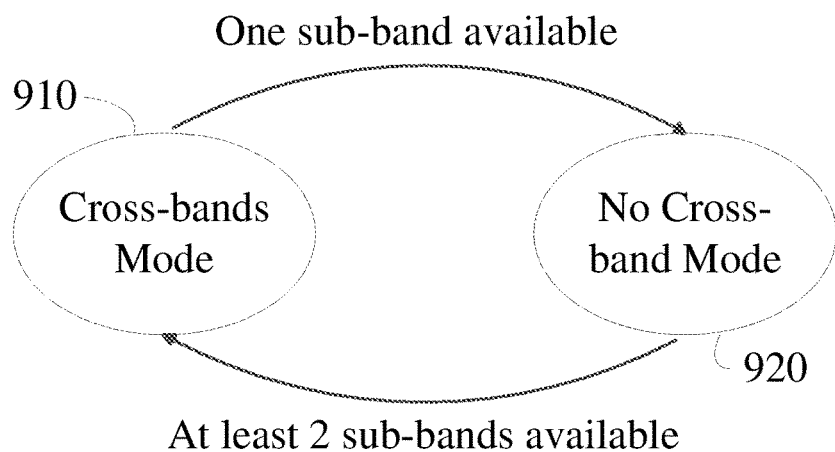
FIG. 8 illustrates another example mapping according to an example embodiment.
FIG. 9 illustrates example states of a UE according to an example embodiment.

The example mapping 700 may be applied for a case of two sub-bands. For more than two sub-bands, the DMRS ports may be separated into more than two groups. For example, for 3 sub-bands, FIG. 8 illustrates a part of an example mapping 800 among preambles, DMRS ports and sub-bands. For example, if a UE transmits its second portion via DMRS port #4 in the sub-band #1, the AN may determine that corresponding first portion is in the sub-band #3

(i.e. "Cross-band") and may include a preamble #1, #2, #3 or #4. if a UE transmits its second portion via DMRS port #6 in the sub-band #2, the AN may determine that corresponding first portion is in the sub-band #2 (i.e. "No Cross-band") and may include a preamble #5, #6, #7 or #8.

As mentioned above, depending on the number of currently available sub-bands, a UE supporting operations on multiple sub-bands may operate in a "Cross-bands Mode" or a "No Cross-band Mode".

As illustrated in FIG. 9, in the Cross-bands Mode 910, the UE may transmit to the AN two portions of a signaling message in different sub-bands, and then may monitor for a response from the AN on multiple sub-bands including the sub-bands for transmitting the two portions. Correspondingly, on the side of AN, the AN may determine that the UE supports operations on multiple sub-bands according to the two different sub-bands of the received two portions, and then may prepare the response on the multiple sub-bands and transmit the response on any one or more of the multiple sub-bands.

As illustrated in FIG. 9, in the Cross-bands Mode 910, the UE may transfer into the No Cross-band Mode 920 when an interference check on one sub-band passes while fails on the other sub-bands.

For example, in connection with the above example mapping 700, for example, the UE may switch the DMRS port used for transmitting the second portion, for example from the DMRS port #1, #2, #3, or #4 to the DMRS port #5, #6, #7, or #8. For example, the used DMRS port may be also dependent on the used preamble. For example, in the No Cross-band Mode 920, the UE may transmit to the AN two portions of the signaling message in the same sub-band via the switched DMRS port of "No Cross-band" type, and then may monitor for the response from the AN on the sub-band for transmitting the two portions. In another example, the UE may also monitor for the response from the AN on the multiple sub-bands.

Correspondingly, on the side of AN, the AN may consider the UE as not supporting operations on multiple sub-bands, based on the fact that the two portions are in the same sub-band, for example according to the indication in the second portion or the DMRS port indicated by the indication in the second portion or the like, and then may prepare and transmit the response on the sub-band of the first and second portions.

As illustrated in FIG. 9, in the No Cross-band Mode 920, the UE may transfer back to the Cross-band Mode 910 when at least 2 sub-bands become available based on another interference checks, so as to monitor for the response from the AN on multiple sub-bands including the two different sub-bands for transmitting the two portions.

In another example embodiment, the indication in the second portion may also indicate that the UE actually supports operations on multiple sub-bands although the first portion and the second portion are transmitted in the same sub-band. For example, DMRS ports may be separated into 3 groups including the above "Cross-band", the above "No Cross-band", and an additional type of "Temporarily No Cross-band" for the case where the UE actually supports operations on multiple sub-bands although the first portion and the second portion are transmitted in the same sub-band. In another example, additional information indicating that the UE actually supports operations may be included in the data part of the second portion. In another example, such additional information may be also included in the first portion. For example, such additional information may include a range of multiple sub-bands supported by the UE.

For example, when the UE actually supporting operations on multiple sub-bands suffers interference check failures on other sub-bands for a time, the UE may configure such indication in the second portion or the above additional information indicating that the UE actually supports operations in the first portion or the second portion, and may transmit both the first portion and the second portion in one sub-band on which an interference check is passed. For example, the second portion may be transmitted via the second portion via a "No Cross-band" DMRS port if the above additional information indicating that the UE actually supports operations is also configured, or the second portion may be transmitted via a "Temporarily No Cross-band".

Correspondingly, on the side of AN, the AN may determine the sub-band of the first portion is the same as the sub-band of the second portion, and thus may link the two portions correctly. Also, the AN may determine the UE as supporting operations on multiple sub-band, based on the above additional information indicating that the UE actually supports operations or based on the "Temporarily No Cross-band" port indicated by the indication, and may further prepare a response on multiple sub-band for example determined according to the additional information. With respect to the response from the AN to the UE, referring to FIG. 1 again, the second signaling message 160 as the response from the AN 120 to the UE 110 may depend on the processing result of the first signaling message 130 on the side.

For example, if the AN 120 may decode a data part of the second portion 150 (e.g. the PUSCH transmission) successfully, the second signaling message 160 as the response may include information on for example Random Access Response (RAR) and Connection Resolution, where the second signaling message 160 may be a combination of the Msg2 and Msg4 in a 4-step RA procedure. Such a second signaling message 160 may be prepared by the AN 120 for example by using downlink control information (DCI) scrambled with RA Radio Network Temporary Identity (RA-RNTI) corresponding to RA resources of the preamble in the first portion 140.

For example, if the AN 120 fails to decode the data part of the second portion 150 but may detect the indication (e.g. the indication 630 or 640 in the above examples), then according to the detected indication, the AN 120 may still determine whether the UE 110 supports receiving response on multiple sub-bands, and may further prepare a RAR for example by using downlink control information (DCI) scrambled with RA Radio Network Temporary Identity (RA-RNTI) corresponding to RA resources of the preamble in the first portion 140, on multiple sub-bands if the first portion 140 and the second portion 150 in the first signaling message are in different sub-bands, or otherwise on the sub-band of the first portion 140.

For example, if the AN 120 fails to detect the indication (e.g. the indication 630 or 640 in the above examples), for example, no such indication is included in the second portion 150, or no second portion 150 is included in the signaling message 130, the AN 120 may prepare a RAR for example by using downlink control information (DCI) scrambled with RA Radio Network Temporary Identity (RA-RNTI) corresponding to RA resources of the preamble in the first portion 140, on the sub-band of the first portion 140.

Figure 10:
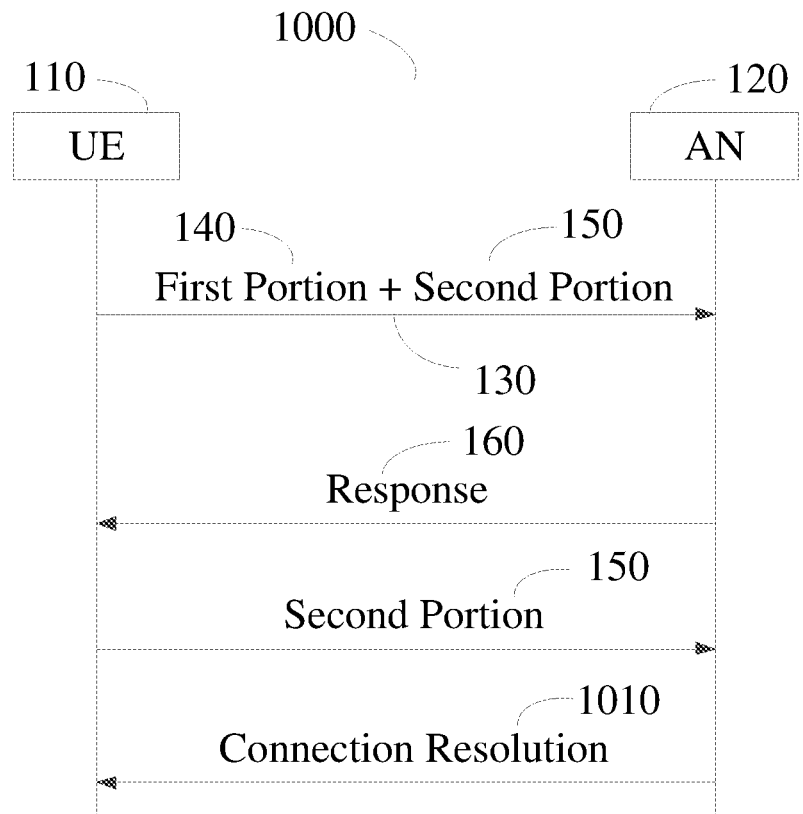
FIG. 10 illustrates another example scenario of utilizing multiple sub-bands according to an example embodiment.

Then, as the example procedure 1000 illustrated in FIG. 10, in response to receiving the second signaling message 160, the UE 110 may prepare the second portion 150 on the sub-band where the second signaling message 160 is received, or on multiple sub-bands, and then transmit the prepared second portion 150 to the AN 120 again in one or more selected sub-bands. Then, in response to receiving the separate second portion 150, the AN 120 may prepare and transmit another response 1010 such as connection resolution information to the UE 110.

Several examples have been described in a context of a RA procedure. It is appreciated that the disclosure is not limited to the above examples. The solution herein may also be applied to any other procedure for example based on sequential protocols. Further, interference checks before transmitting may be optional. That is, transmitting different portions of a signaling message in different sub-bands may not depend on the interference check outcomes. Further, in another example embodiment, the considered sub-bands may be not limited to the above 2 or 3 sub-bands, and instead may be any number of sub-bands. Further, in another example embodiment, a signaling message for transmission may include 3, 4 or more portions, and different portions or different sets of portions may be transmitted in different sub-bands. Further, the indication to correspondence between respective portions of the signaling message for transmission or information on sub-bands of respective portions of the signaling message for a transmission may be included in any one or more suitable portions of the signaling message for transmission and may be in any suitable forms.

Figure 11:
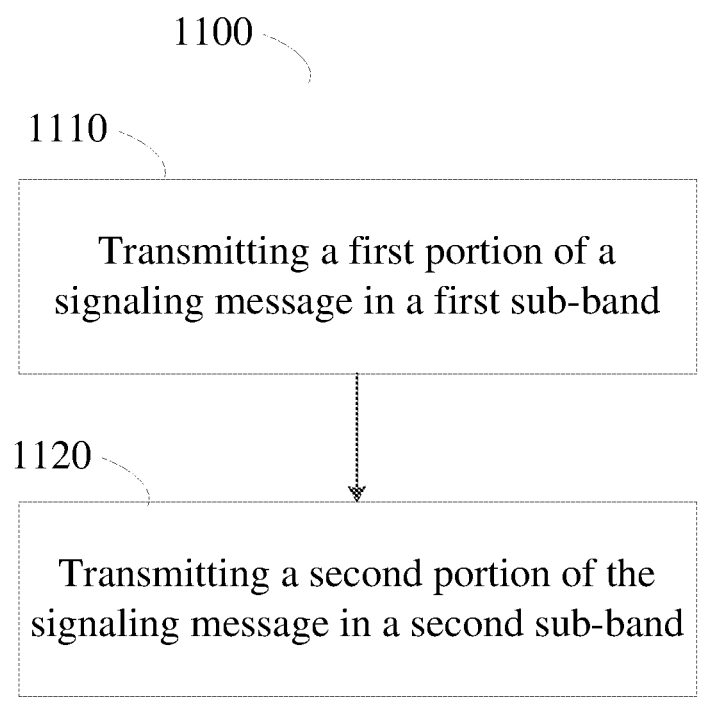
FIG. 11 illustrates an example method according to an example embodiment.

FIG. 11 illustrates an example method 1100 according to an example embodiment. For example, the example method 1100 may be applied to a UE, such as the UE 110 in FIG. 1 and the like.

As illustrated in FIG. 11, the example method 1100 may include a step 1110 of transmitting a first portion (e.g. the first portion 140 in FIG. 1) of a signaling message (e.g. the first signaling message 130 in FIG. 1) in a first sub-band (e.g. the sub-band 210 in FIG. 3), and a step 1120 of transmitting a second portion (e.g. the first portion 150 in FIG. 1) of the signaling message in a second sub-band (e.g. the sub-band 220 in FIG. 3), where the second portion may include an indication (e.g. the indication 630 or 640 in FIG. 6) of a correspondence between the first portion and the second portion, for example, the indication may indicate the first portion transmitted in the first sub-band.

As described above, through transmitting respective portions in the signaling message for transmission in respective sub-bands, more advantages of the frequency diversity techniques may be taken, for example, robustness against interference check may be increased. And through including indication to correspondence between the first portion and the second portion in the second portion, the AN may know correct first portion that the UE transmitted, and then may decoding the data part in the second portion based on the information in the first portion.

In an example embodiment, the second sub-band may be different from the first sub-band, for example when an interference check on the second sub-band is passed. In another example embodiment, interference checks may be optional, and the first sub-band and the second sub-band may be any different sub-bands selected by the UE according to any suitable rules or negotiated between the UE and the AN.

Figure 12:
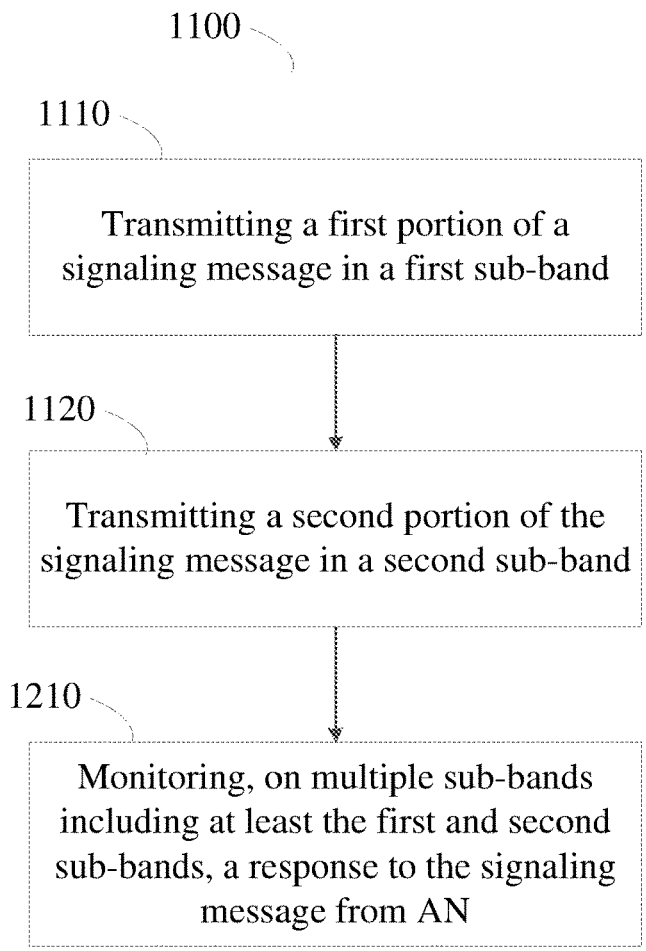
FIG. 12 illustrates another example method according to an example embodiment.

In another example embodiment, as illustrated in FIG. 12, the example method 1100 may further include a step 1210 of monitoring, on multiple sub-bands including at least the first and second sub-bands, for a response to the signaling message from AN.

As described above, in an example embodiment, the example method 1100 may be applied to a RA procedure. For example, the first portion may include a preamble for a RA procedure and the second portion may further include a data part of the RA procedure. Further, the indication may include a mapping (e.g. a mapping item in the example mapping 700 or 800, or the example mapping 700 or 800) between the preamble in the first portion in the first sub-band and a DMRS port for transmitting the second portion.

Further, as described above, a UE supporting operations on multiple sub-bands may operate in either a Cross-band Mode or a No Cross-band Mode. Correspondingly, in an example embodiment, the second portion may be instead transmitted in the first sub-band, in a case where an interference check on other sub-band or sub-bands than the first sub-band fails.

Figure 13:
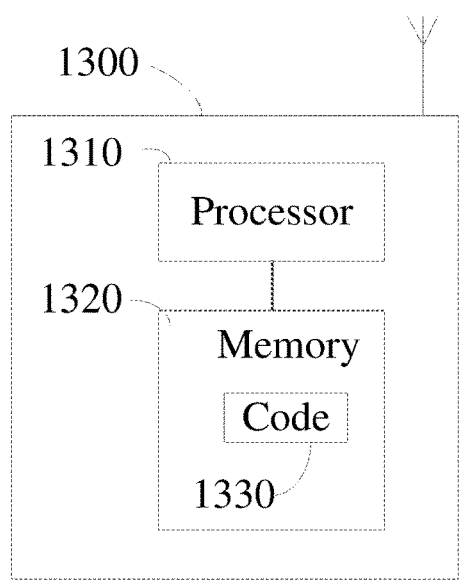
FIG. 13 illustrates an example apparatus according to an example embodiment.

FIG. 13 illustrates an example apparatus 1300 according to an example embodiment, which, for example, may be at least a part of the UE 110.

As illustrated in FIG. 13, the example apparatus 1300 may include at least one processor 1310 and at least one memory 1320 that may include computer program code 1330. The at least one memory 1320 and the computer program code 1330 may be configured to, with the at least one processor 1310, cause the apparatus 1300 at least to perform at least the example method 1100 described above.

In various example embodiments, the at least one processor 1310 in the example apparatus 1300 may include, but not limited to, at least one hardware processor, including at least one microprocessor such as a central processing unit (CPU), a portion of at least one hardware processor, and any other suitable dedicated processor such as those developed based on for example Field Programmable Gate Array (FPGA) and Application Specific Integrated Circuit (ASIC). Further, the at least one processor 1310 may also include at least one other circuitry or element not shown in FIG. 13.

In various example embodiments, the at least one memory 1320 in the example apparatus 1300 may include at least one storage medium in various forms, such as a volatile memory and/or a non-volatile memory. The volatile memory may include, but not limited to, for example, a random-access memory (RAM), a cache, and so on. The non-volatile memory may include, but not limited to, for example, a read only memory (ROM), a hard disk, a flash memory, and so on. Further, the at least memory 1320 may include, but are not limited to, an electric, a magnetic, an optical, an electromagnetic, an infrared, or a semiconductor system, apparatus, or device or any combination of the above.

Further, in various example embodiments, the example apparatus 1300 may also include at least one other circuitry, element, and interface, for example at least one I/O interface, at least one antenna element, and the like.

In various example embodiments, the circuitries, parts, elements, and interfaces in the example apparatus 1300, including the at least one processor 1310 and the at least one memory 1320, may be coupled together via any suitable connections including, but not limited to, buses, crossbars, wiring and/or wireless lines, in any suitable ways, for example electrically, magnetically, optically, electromagnetically, and the like.

Figure 14:
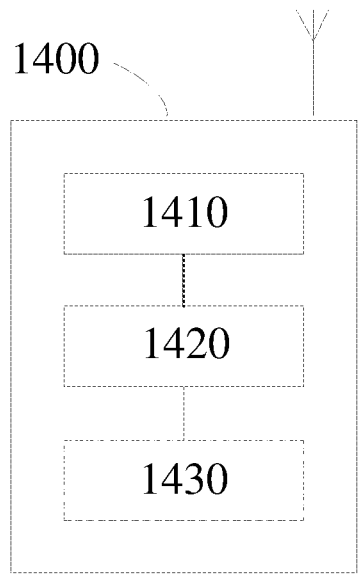
FIG. 14 illustrates another example apparatus according to an example embodiment.

The structure of the apparatus on the side of the UE 110 is not limited to the above example apparatus 1300. FIG. 14 illustrates another example apparatus 1400 according to an example embodiment, which, for example, may be at least of part of the UE 110.

As shown in FIG. 14, the example apparatus 1400 may include means 1410 for performing the step 1110 of the example method 1100, means 1420 for performing the step 1120 of the example method 1100.

In one or more another example embodiments, the example apparatus 1400 may further include one or more another means for performing other additional or alternative steps in the example method 1100. For example, as illustrated in FIG. 14, the example apparatus 1400 may further include means 1430 for performing the step 1210 of the example method 1100. Further, for example, at least one I/O interface, at least one antenna element, and the like may also included in the example apparatus 1400.

In another example embodiment, an apparatus, which for example may be applied on the side of UE, may include one or more circuitries. For example, such apparatus may include a circuitry configured to perform the step 1110 of the example method 1100, a circuitry configured to perform the step 1120 of the example method 1100, a circuitry configured to perform the step 1210 of the example method 1100, and the like. In one or more another example embodiments, such apparatus may further include one or more another circuitries configured to perform other additional or alternative steps in the example method 1100. Further, for example, at least one I/O interface, at least one antenna element, and the like may also included in such apparatus.

The term "circuitry" throughout this disclosure may refer to one or more or all of the following: (a) hardware-only circuit implementations (such as implementations in only analog and/or digital circuitry); (b) combinations of hardware circuits and software, such as (as applicable) (i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions); and (c) hardware circuit(s) and or processor(s), such as a microprocessor(s) or a portion of a microprocessor(s), that requires software (e.g., firmware) for operation, but the software may not be present when it is not needed for operation. This definition of circuitry applies to all uses of this term in this disclosure, including in any claims. As a further example, as used in this disclosure, the term circuitry also covers an implementation of merely a hardware circuit or processor (or multiple processors) or portion of a hardware circuit or processor and its (or their) accompanying software and/or firmware. The term circuitry also covers, for example and if applicable to the claim element, a baseband integrated circuit or processor integrated circuit for a mobile device or a similar integrated circuit in server, a cellular network device, or other computing or network device.

Several example embodiments on the side of the UE 110 have been described above by way of non-limiting examples. More details on the side of the AN 120 will now be described by way of non-limiting examples.

Figure 15:
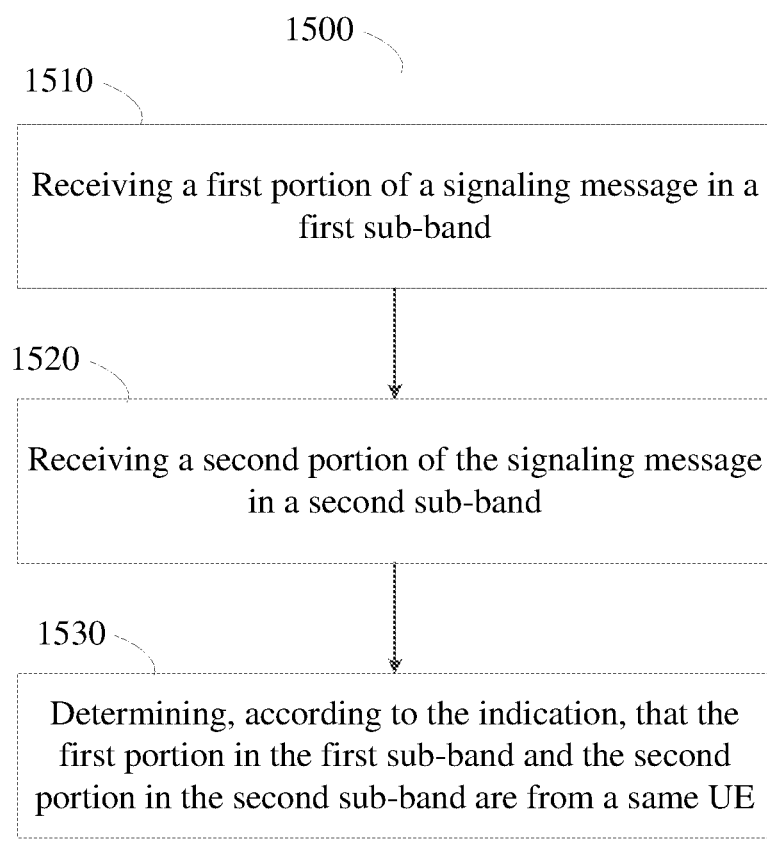
FIG. 15 illustrates an example method according to an example embodiment.

FIG. 15 illustrates an example method 1500 according to an example embodiment, which, for example, may be performed on the side of the AN 120.

As illustrated in FIG. 15, corresponding to the step 1110 of the example method 1100, the example method 1500 may include a step 1510 of receiving a first portion (e.g. the first portion 140 in FIG. 1) of a signaling message (e.g. the first signaling message 130 in FIG. 1) in a first sub-band (e.g. the sub-band 210 in FIG. 3). Corresponding to the step 1120 of the example method 1100, the example method 1500 may include a step 1520 of receiving a second portion (e.g. the first portion 150 in FIG. 1) of the signaling message in a second sub-band (e.g. the sub-band 220 in FIG. 3), where the second portion may include an indication (e.g. the indication 640 or 650 in FIG. 6) of a correspondence between the first portion and the second portion, for example, the indication may indicate the first portion received in the first sub-band. Further, the example method 1500 may further include a step 1530 of determining, according to the indication, that the first portion in the first sub-band and the second portion in the second sub-band are from a same UE.

As described above, according to the indication included in the second portion, the AN may know whether a UE supports operations on multiple sub-bands (e.g. monitoring for a response on multiple sub-bands), and may determine the multiple sub-bands according to the first sub-band of the first portion and the second sub-band of the second portion. Further, according to the indication included in the second portion, the AN may know which sub-band is the first sub-band of the first portion corresponding to the second portion in the second sub-band. As such, the AN may link the correct first portion in the first sub-band with the second portion in the second sub-band, and then may then extract for example correct timing alignment information from the first portion, which may in turn aid the AN in decoding for example the data part in the second portion.

In various example embodiments, the step 1530 of determining may be either explicit or implicit.

Figure 16:
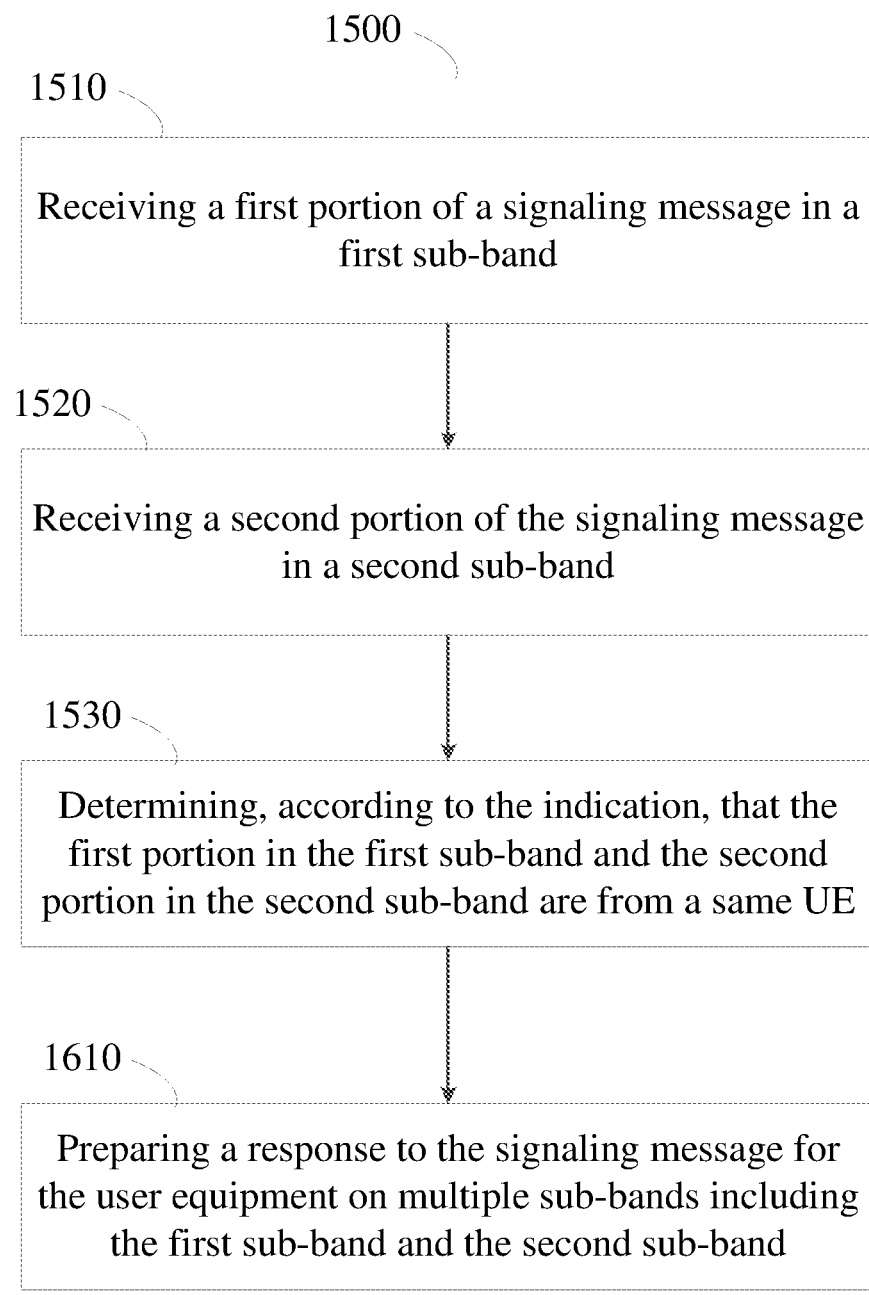
FIG. 16 illustrates another example method according to an example embodiment.

In an example embodiment, as illustrated in FIG. 16, corresponding to the step 1210 of the example 1100, the example 1500 may further include a step 1610 of preparing a response to the signaling message for the user equipment on multiple sub-bands including the first sub-band and the second sub-band when the second sub-band of the second portion is different from the first sub-band of the first portion.

Further, in an example embodiment, corresponding to the step 1210 of the example 1100, the example 1500 may further include a step of transmitting the response in at least one sub-band of the multiple sub-bands when an interference check on the at least one sub-band is passed.

In an example embodiment, for example, when the second sub-band is the same as the first sub-band, or in a case of a failure in a detection of the indication in the second portion in the second sub-band, the response to the signaling message for the UE may be prepared on the first sub-band.

As described above, in an example embodiment, the example method 1100 may be applied to a RA procedure. For example, the first portion may include a preamble for a RA procedure and the second portion may further include a data part of the RA procedure. Further, the indication may include a mapping (e.g. a mapping item in the example mapping 700 or 800, or the example mapping 700 or 800) between the preamble in the first portion in the first sub-band and a DMRS port for transmitting the second portion. Thus, the first portion and the second portion may be determined to be from the same user equipment based on the mapping.

Figure 17:
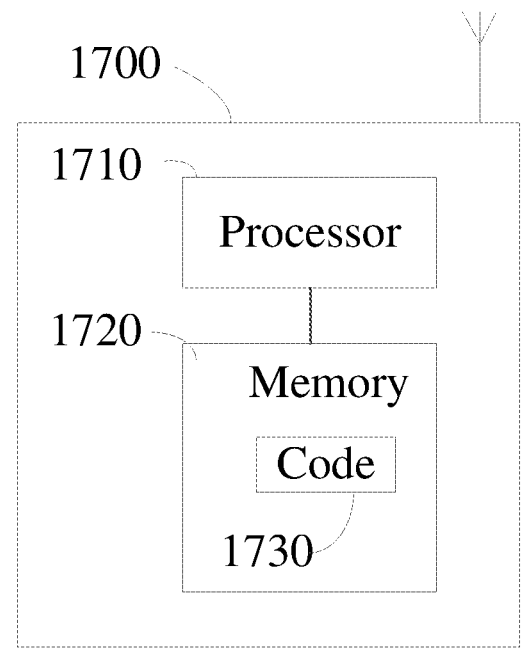
FIG. 17 illustrates an example apparatus according to an example embodiment.

FIG. 17 illustrates an example apparatus 1700 according to an example embodiment, which, for example, may be at least a part of the AN 120, e.g. at least a part of a base station of the AN 120.

As shown in FIG. 17, the example apparatus 1700 may include at least one processor 1710 and at least one memory 1720 that may include computer program code 1730. The at least one memory 1720 and the computer program code 1730 may be configured to, with the at least one processor 1710, cause the apparatus 1700 at least to perform at least the example method 1500 described above.

In various example embodiments, the at least one processor 1710 in the example apparatus 1700 may include, but not limited to, at least one hardware processor, including at least one microprocessor such as a CPU, a portion of at least one hardware processor, and any other suitable dedicated processor such as those developed based on for example FPGA and ASIC. Further, the at least one processor 1710 may also include at least one other circuitry or element not shown in FIG. 17.

In various example embodiments, the at least one memory 1720 in the example apparatus 1700 may include at least one storage medium in various forms, such as a volatile memory and/or a non-volatile memory. The volatile memory may include, but not limited to, for example, a RAM, a cache, and so on. The non-volatile memory may include, but not limited to, for example, a ROM, a hard disk, a flash memory, and so on. Further, the at least memory 1720 may include, but are not limited to, an electric, a magnetic, an optical, an electromagnetic, an infrared, or a semiconductor system, apparatus, or device or any combination of the above.

Further, in various example embodiments, the example apparatus 1700 may also include at least one other circuitry, element, and interface, for example at least one I/O interface, at least one antenna element, and the like.

In various example embodiments, the circuitries, parts, elements, and interfaces in the example apparatus 1700, including the at least one processor 1710 and the at least one memory 1720, may be coupled together via any suitable connections including, but not limited to, buses, crossbars, wiring and/or wireless lines, in any suitable ways, for example electrically, magnetically, optically, electromagnetically, and the like.

Figure 18:
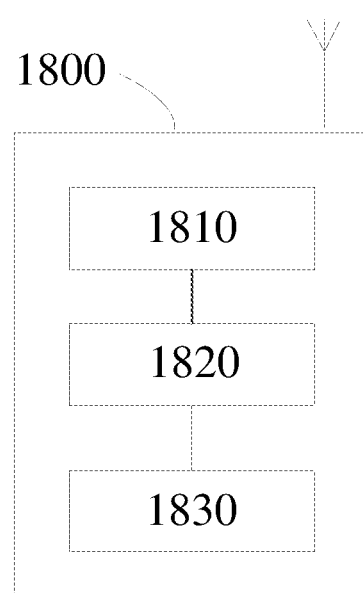
FIG. 18 illustrates another example apparatus according to an example embodiment.

The structure of the apparatus on the side of the AN 120 is not limited to the above example apparatus 1700. FIG. 18 illustrates another example apparatus 1800 according to an example embodiment, which, for example, may be at least a part of the AN 120, e.g. at least a part of a base station of the AN 120.

As shown in FIG. 18, the example apparatus 1800 may include means 1810 for performing the step 1510 of the example method 1500, means 1820 for performing the step 1520 of the example method 1500, and means 1830 for performing the step 1530 of the example method 1500.

In one or more another example embodiments, the example apparatus 1400 may further include one or more another means for performing other additional or alternative steps in the example method 1400. For example, the example apparatus 1800 may further include one or more another means for performing the step 1610. Further, for example, at least one I/O interface, at least one antenna element, and the like may also included in the example apparatus 1800.

In another example embodiment, an apparatus, which for example may be applied on the side of AN, may include one or more circuitries. For example, such apparatus may include a circuitry configured to perform the step 1510 of the example method 1500, a circuitry configured to perform the step 1520 of the example method 1500, a circuitry configured to perform the step 1530 of the example method 1500, and the like. In one or more another example embodiments, such apparatus may further include one or more another circuitries configured to perform other additional or alternative steps in the example method 1500. Further, for example, at least one I/O interface, at least one antenna element, and the like may also included in such apparatus.

Another example embodiment may relate to computer program codes or instructions which may cause an apparatus to perform at least respective methods described above.

Another example embodiment may be related to a computer readable medium having such computer program codes or instructions stored thereon. In various example embodiments, such a computer readable medium may include at least one storage medium in various forms such as a volatile memory and/or a non-volatile memory. The volatile memory may include, but not limited to, for example, a RAM, a cache, and so on. The non-volatile memory may include, but not limited to, a ROM, a hard disk, a flash memory, and so on.

Several example embodiments have been described above in a context of RA procedure between UE and AN. However, it is appreciated that this disclosure is not limited to the example RA procedure. Also, the signaling procedure implemented by the solution of the disclosure is not limited to the signaling procedure between UE and AN. In various embodiments, the above example methods 1100 and 1500 may be applied to any transmitter and any receiver, respectively, in any other signaling procedure by sequential protocols. For example, the above example apparatus 1300 or 1400 or the like, which may be configured to implement the example method 1100, may also be at least a part of an AN (e.g. at least a part of a base station of the AN) when the AN acts as a transmitter. For example, the above example apparatus 1700 or 1800 or the like, which may be configured to implement the example method 1500, may also be at least a part of a UE, such as a mobile phone, a tablet, a vehicle, and the like, when the UE acts as a receiver. For example, for any two mobile devices (e.g. two vehicles) expecting to communicate with each other in a context of Vehicle-to-Everything (V2X), one may implement the example method 1100, and the other may implement the example method 1500.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." The word "coupled", as generally used herein, refers to two or more elements that may be either directly connected, or connected by way of one or more intermediate elements. Likewise, the word "connected", as generally used herein, refers to two or more elements that may be either directly connected, or connected by way of one or more intermediate elements. Additionally, the words "herein," "above," "below," and words of similar import, when used in this application, shall refer to this application as a whole and not to any particular portions of this application. Where the context permits, words in the description using the singular or plural number may also include the plural or singular number respectively. The word "or" in reference to a list of two or more items, that word covers all of the following interpretations of the word: any of the items in the list, all of the items in the list, and any combination of the items in the list.

Moreover, conditional language used herein, such as, among others, "can," "could," "might," "may," "e.g.," "for example," "such as" and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While some example embodiments have been described, these embodiments have been presented by way of example, and are not intended to limit the scope of the disclosure. Indeed, the apparatus, methods, and systems described herein may be embodied in a variety of other forms; furthermore, various omissions, substitutions and changes in the form of the methods and systems described herein may be made without departing from the spirit of the disclosure. For example, while blocks are presented in a given arrangement, alternative embodiments may perform similar functionalities with different components and/or circuit topologies, and some blocks may be deleted, moved, added, subdivided, combined, and/or modified. Each of these blocks may be implemented in a variety of different ways. The order of these blocks may also be changed. Any suitable combination of the elements and acts of the various embodiments described above can be combined to provide further embodiments. The accompanying claims and their equivalents are intended to cover such forms or modifications as would fall within the scope and spirit of the disclosure.

What is claimed is:

1. A method comprising:
performing a first interference check on a first sub-band and a second sub-band, wherein the first sub-band is different from the second sub-band;
based on the first interference check, selecting the first sub-band for transmitting a first portion of a signaling message and in response to the selecting, transmitting the first portion of the signaling message in the first sub-band;
performing a second interference check on the second sub-band;
selecting the second sub-band for transmitting a second portion of the signaling message based on passing the second interference check on the second sub-band, the second portion including an indication to the first portion transmitted in the first sub-band,
wherein the first portion includes a preamble part of a random access procedure and the second portion further includes a data part of the random access procedure,
wherein the indication includes a mapping between the preamble part in the first portion in the first sub-band and a demodulation reference signal port for transmitting the second portion; and
monitoring for a response to the signaling message from an access network on multiple sub-bands including at least the first and second sub-bands.

2. The method of claim 1, further comprising:
for a second signaling message comprising a second first portion and a second portion:
performing a third interference check on the first sub-band and the second sub-band;
transmitting the second first portion of the second signaling message in the first sub-band based on a result of the third interference check;
performing a fourth interference check on the second sub-band; and
selecting the first sub-band for transmitting the second portion based on a result of the fourth interference check, wherein the second portion is transmitted in the first sub-band when the fourth interference check on the second sub-band fails.

3. An apparatus comprising:
at least one processor; and
at least one memory including computer program code, the at least one memory and the computer program code being configured to, with the at least one processor, cause the apparatus to:
perform a first interference check on a first sub-band and a second sub-band,
wherein the first sub-band is different from the second sub-band;
based on the first interference check, selecting the first sub-band for transmitting a first portion of a signaling message and in response to the selecting, transmitting the first portion of the signaling message in the first sub-band;
perform a second interference check on the second sub-band;
select the second sub-band to transmit a second portion of the signaling message, based on passing the second interference check on the second sub-band, the second portion including an indication to the first portion transmitted in the first sub-band,
wherein the first portion includes a preamble part of a random access procedure and the second portion further includes a data part of the random access procedure,
wherein the indication includes a mapping between a preamble part in the first portion in the first sub-band and a demodulation reference signal port for transmitting the second portion; and
monitor for a response to the signaling message from an access network on multiple sub-bands including at least the first and second sub-bands.

4. The apparatus of claim 3, further comprising:
for a second signaling message comprising a second first portion and a second portion:
performing a third interference check on the first sub-band and the second sub-band;
transmitting the second first portion of the second signaling message in the first sub-band;
performing a fourth interference check on the second sub-band; and
selecting the first sub-band for transmitting the second portion based on a result of the fourth interference check, wherein the second portion is transmitted in the first sub-band when the fourth interference check on the second sub-band fails.

5. A non-transitory computer readable medium comprising instructions stored thereon for causing an apparatus to perform:
performing a first interference check on a first sub-band and a second sub-band, wherein the first sub-band is different from the second sub-band;
based on the first interference check, selecting the first sub-band for transmitting a first portion of a signaling message and in response to the selecting, transmitting the first portion of the signaling message in the first sub-band;
performing a second interference check on the second sub-band;
selecting the second sub-band for transmitting a second portion of the signaling message based on passing the second interference check on the second sub-band and in response to the selecting of the second sub-band, transmitting the second portion of the signaling message in the second band, the second portion including an indication to the first portion transmitted in the first sub-band, wherein the first portion includes a preamble part of a random access procedure and the second portion includes a data part of the random access procedure, wherein the indication includes a mapping between a preamble part in the first portion in the first sub-band and a demodulation reference signal port for transmitting the second portion; and monitoring for a response to the signaling message from an access network on multiple sub-bands including at least the first and second sub-bands.

6. The non-transitory computer readable medium of claim 5, further comprising instructions thereon for causing the apparatus to perform:

for a second signaling message comprising a second first portion and a second portion:
performing a third interference check on the first sub-band and the second sub-band;
transmitting the second first portion of the second signaling message in the first sub-band;
performing a fourth interference check on the second sub-band;
selecting the first sub-band for transmitting the second portion based on a result of the fourth interference check, wherein the second portion is transmitted in the first sub-band when the fourth interference check on the second sub-band fails.

* * * * *